US012583762B2

(12) United States Patent
Sáez Martínez

(10) Patent No.: US 12,583,762 B2
(45) Date of Patent: Mar. 24, 2026

(54) SCREENING DEVICE FOR USE IN COARSE MATTER SCREENING WELLS OF A WASTE WATER TREATMENT PLANT

(71) Applicant: DEYMA LA MANCHA, S.L., Tomelloso (ES)

(72) Inventor: Carlos J. Sáez Martínez, Tomelloso (ES)

(73) Assignee: DEYMA LA MANCHA, S.L., Tomelloso (ES)

( * ) Notice: Subject to any disclaimer, the term of this patent is extended or adjusted under 35 U.S.C. 154(b) by 380 days.

(21) Appl. No.: 18/251,713

(22) PCT Filed: Nov. 5, 2021

(86) PCT No.: PCT/ES2021/070796

§ 371 (c)(1),
(2) Date: May 3, 2023

(87) PCT Pub. No.: WO2022/096767

PCT Pub. Date: May 12, 2022

(65) Prior Publication Data

US 2024/0010522 A1     Jan. 11, 2024

(30) Foreign Application Priority Data

Nov. 5, 2020    (ES) ............................... ES202031113

(51) Int. Cl.
C02F 1/00          (2023.01)
(52) U.S. Cl.
CPC ........ C02F 1/004 (2013.01); C02F 2001/007 (2013.01); C02F 2201/002 (2013.01); C02F 2303/14 (2013.01)

(58) Field of Classification Search
None
See application file for complete search history.

(56) References Cited

U.S. PATENT DOCUMENTS 332,790 A * 12/1885 Crisman ................. E02B 8/026
                                                              210/159
414,887 A * 11/1889 Eilers ..................... E02B 8/026
                                                              210/159

(Continued)

FOREIGN PATENT DOCUMENTS

EP          0098820 A2      1/1984
WO          0048705 A1      8/2000

*Primary Examiner* — Robert J Popovics
(74) *Attorney, Agent, or Firm* — S.J. INTELLECTUAL PROPERTY LTD.

(57)          ABSTRACT

The invention relates to a screening device in coarse solids chambers in a wastewater treatment plant, which has a coarse solids chamber (1) in which heavier solids will settle directly at the bottom, whereas lighter solids seek to escape through an opening (3) leading to a pumping chamber (2), having a first retention grating (4) positioned covering the opening (3) communicating both chambers (1, 2), on which a cleaning mechanism acts periodically; and a second grating (4) identical to the aforementioned one initially at rest in the upper part, above the water level, where by means of respective movement mechanisms both gratings (4) are interchanged from the resting position to the operating position opposite the opening (3). It also has a cleaning brush mechanism (5) for cleaning the gratings (4) when they are positioned in the upper portion at rest.

5 Claims, 3 Drawing Sheets

(56) References Cited

U.S. PATENT DOCUMENTS

| | | | | |
|---|---|---|---|---|
| 452,702 A * | 5/1891 | Grabill | B01D 21/0012 | |
| | | | 210/160 | |
| 495,023 A * | 4/1893 | Correll | E02B 8/026 | |
| | | | 210/159 | |
| 623,828 A * | 4/1899 | Riensch | E03F 5/14 | |
| | | | 210/159 | |
| 658,196 A * | 9/1900 | Whitney | B01D 33/04 | |
| | | | 210/160 | |
| 674,017 A * | 5/1901 | Riensch | E02B 8/026 | |
| | | | 210/159 | |
| 677,567 A * | 7/1901 | Freeman | B01D 33/04 | |
| | | | 210/160 | |
| 905,158 A * | 12/1908 | Dugas et al. | B01D 21/245 | |
| | | | 210/159 | |
| 1,420,283 A * | 6/1922 | Randlett | E02B 8/026 | |
| | | | 210/162 | |
| 1,435,770 A * | 11/1922 | Welser | B01D 33/048 | |
| | | | 210/160 | |
| 1,483,667 A * | 2/1924 | Landreth et al. | B01D 33/067 | |
| | | | 15/88.4 | |
| 1,494,875 A * | 5/1924 | Yeomans | G05D 9/12 | |
| | | | 417/372 | |
| 1,529,602 A * | 3/1925 | Maine | E02B 8/026 | |
| | | | 210/159 | |
| 1,613,007 A * | 1/1927 | Yeomans | F04D 15/0218 | |
| | | | 417/40 | |
| 1,768,314 A * | 6/1930 | Folta | B01D 35/147 | |
| | | | 210/162 | |
| 1,794,504 A * | 3/1931 | Van Norman | E02B 8/026 | |
| | | | 210/162 | |
| 1,823,823 A * | 9/1931 | Dundas | E02B 8/026 | |
| | | | 210/162 | |
| 1,881,270 A * | 10/1932 | Evers | E02B 8/026 | |
| | | | 210/162 | |
| 1,920,158 A * | 7/1933 | Albertson | E02B 8/026 | |
| | | | 210/159 | |
| 1,959,491 A * | 5/1934 | Moran | B01D 29/6484 | |
| | | | 210/159 | |
| 1,984,891 A * | 12/1934 | Miick | E02B 8/026 | |
| | | | 210/162 | |
| 2,020,728 A * | 11/1935 | Kinsey | E02B 8/026 | |
| | | | 210/159 | |
| 2,033,653 A * | 3/1936 | Schlapak | E02B 8/026 | |
| | | | 210/162 | |
| 2,061,169 A * | 11/1936 | Philips | E02B 7/26 | |
| | | | 405/108 | |
| 2,102,570 A * | 12/1937 | Lind | E02B 8/026 | |
| | | | 210/162 | |
| 2,106,851 A * | 2/1938 | Nordell | B02C 18/0092 | |
| | | | 210/162 | |
| 2,128,345 A * | 8/1938 | Briggs | E02B 8/026 | |
| | | | 210/162 | |
| 2,128,346 A * | 8/1938 | Briggs | E02B 8/026 | |
| | | | 210/159 | |
| 2,128,347 A * | 8/1938 | Briggs | E02B 8/026 | |
| | | | 210/138 | |
| 2,186,790 A * | 1/1940 | Smyser | 210/162 | |
| 2,335,573 A * | 11/1943 | Scott | E02B 8/026 | |
| | | | 210/159 | |
| 2,468,249 A | 4/1949 | Wadleigh | | |
| 2,647,085 A * | 7/1953 | Tolman | 210/162 | |
| 2,671,563 A * | 3/1954 | Benner, Jr. | E02B 8/026 | |
| | | | 210/159 | |
| 2,672,985 A * | 3/1954 | Nordell | B02C 18/0092 | |
| | | | 241/243 | |
| 2,904,181 A * | 9/1959 | Baker | E02B 8/026 | |
| | | | 210/159 | |
| 2,963,156 A * | 12/1960 | Nordell | E02B 8/026 | |
| | | | 210/138 | |
| 2,996,189 A | 8/1961 | Salterbach | | |
| 3,018,893 A * | 1/1962 | Collie | E02B 8/026 | |
| | | | 210/159 | |

| | | | | |
|---|---|---|---|---|
| 3,144,406 A * | 8/1964 | Crise | E02B 8/026 | |
| | | | 210/159 | |
| 3,152,075 A * | 10/1964 | Gross | E02B 8/026 | |
| | | | 210/159 | |
| 3,193,104 A * | 7/1965 | Leach | E02B 8/026 | |
| | | | 210/162 | |
| 3,325,013 A * | 6/1967 | Cyphers | E02B 8/026 | |
| | | | 210/159 | |
| 3,482,698 A * | 12/1969 | Lennart | E02B 8/026 | |
| | | | 210/159 | |
| 3,572,805 A * | 3/1971 | Murphy | B01D 29/445 | |
| | | | 212/84 | |
| 3,591,006 A * | 7/1971 | Daferner | E02B 8/026 | |
| | | | 210/159 | |
| 3,755,846 A * | 9/1973 | Sandler | E02B 8/026 | |
| | | | 15/93.1 | |
| 3,909,411 A * | 9/1975 | Angele | E02B 8/026 | |
| | | | 210/162 | |
| 4,184,957 A * | 1/1980 | Botsch | E02B 8/026 | |
| | | | 210/159 | |
| 4,214,989 A * | 7/1980 | Rudolph | E02B 8/026 | |
| | | | 210/159 | |
| 4,289,619 A * | 9/1981 | Sampson | B01D 29/03 | |
| | | | 210/159 | |
| 4,447,323 A * | 5/1984 | Jackson | E02B 1/006 | |
| | | | 210/159 | |
| 4,561,975 A * | 12/1985 | Schloss, Jr. | B01D 25/38 | |
| | | | 210/162 | |
| 4,670,142 A * | 6/1987 | Lowry | B03B 5/623 | |
| | | | 210/207 | |
| 4,725,365 A * | 2/1988 | Albrecht, III | E02B 8/026 | |
| | | | 210/791 | |
| 4,725,366 A * | 2/1988 | Dacus | E02B 8/026 | |
| | | | 210/791 | |
| 4,780,199 A * | 10/1988 | Ezzell | B01D 29/445 | |
| | | | 210/162 | |
| 4,792,394 A * | 12/1988 | Rudzinski | B01D 29/01 | |
| | | | 210/162 | |
| 4,917,796 A * | 4/1990 | Rudzinski | B01D 29/6423 | |
| | | | 210/162 | |
| 5,032,263 A * | 7/1991 | Rudzinski | B01D 29/6484 | |
| | | | 210/162 | |
| 5,167,803 A * | 12/1992 | Newton | B01D 29/6484 | |
| | | | 210/162 | |
| 5,246,573 A * | 9/1993 | Lodholz | B01D 29/01 | |
| | | | 210/162 | |
| 5,277,799 A | 1/1994 | Bransch | | |
| 5,300,221 A * | 4/1994 | Austevoll | B01D 33/50 | |
| | | | 210/159 | |
| 5,490,922 A * | 2/1996 | Gresa | B01D 29/945 | |
| | | | 210/162 | |
| 5,534,140 A * | 7/1996 | Brummond | E02B 8/026 | |
| | | | 210/162 | |
| 5,718,771 A * | 2/1998 | Cassell | E02B 8/026 | |
| | | | 210/791 | |
| 6,010,013 A | 1/2000 | Brauch et al. | | |
| 6,409,915 B1 * | 6/2002 | Rusch | B01D 29/44 | |
| | | | 210/162 | |
| 6,490,941 B1 * | 12/2002 | Hur | B01D 33/801 | |
| | | | 74/25 | |
| 6,551,516 B1 * | 4/2003 | Castleberry | B01D 21/2433 | |
| | | | 210/776 | |
| 6,613,238 B2 * | 9/2003 | Schloss | B01D 35/02 | |
| | | | 210/791 | |
| 6,644,342 B1 * | 11/2003 | Bogan | E02D 29/121 | |
| | | | 52/21 | |
| 6,676,833 B2 * | 1/2004 | Castleberry | B01D 21/04 | |
| | | | 210/776 | |
| 6,709,578 B2 * | 3/2004 | Wilcher | B01D 33/801 | |
| | | | 210/232 | |
| 6,770,206 B2 * | 8/2004 | Gasvoda | C02F 1/008 | |
| | | | 210/744 | |
| 6,896,820 B2 * | 5/2005 | Mattox | B01D 29/445 | |
| | | | 210/791 | |
| 6,913,690 B2 * | 7/2005 | Mattox | B01D 29/03 | |
| | | | 210/159 | |

(56)        References Cited

U.S. PATENT DOCUMENTS

| | | | | |
|---|---|---|---|---|
| 7,014,754 B2 * | 3/2006 | Wilcher | ............... | B01D 33/333 |
| | | | | 210/232 |
| 7,144,500 B2 * | 12/2006 | Rybar | .................... | B01D 21/34 |
| | | | | 210/159 |
| 7,326,336 B2 * | 2/2008 | Jackson | ............... | B01D 33/503 |
| | | | | 210/159 |
| 11,633,680 B2 * | 4/2023 | Simonelli | ............ | B01D 29/445 |
| | | | | 210/357 |
| 2003/0080035 A1 * | 5/2003 | Wilcher | ............... | B01D 33/801 |
| | | | | 210/160 |
| 2003/0155286 A1 * | 8/2003 | Wilcher | ............... | B01D 33/275 |
| | | | | 210/160 |
| 2004/0112845 A1 * | 6/2004 | Mattox | .................. | B01D 29/01 |
| | | | | 210/791 |
| 2004/0149638 A1 * | 8/2004 | Wilcher | ............... | B01D 33/801 |
| | | | | 210/158 |
| 2005/0000918 A1 * | 1/2005 | Burgess | ................ | B07B 1/4609 |
| | | | | 210/791 |
| 2005/0279681 A1 * | 12/2005 | Wilcher | ............... | B01D 33/275 |
| | | | | 210/160 |
| 2006/0037897 A1 * | 2/2006 | Jackson | .................. | E02B 8/026 |
| | | | | 210/159 |
| 2007/0090031 A1 * | 4/2007 | Rybar | .................... | E02B 8/026 |
| | | | | 210/523 |
| 2007/0241039 A1 * | 10/2007 | Wilcher | ............... | B01D 33/333 |
| | | | | 210/160 |
| 2007/0246412 A1 * | 10/2007 | Hur | ...................... | B01D 21/245 |
| | | | | 210/357 |
| 2011/0315638 A1 | 12/2011 | Kelly et al. | | |
| 2023/0264123 A1 * | 8/2023 | Blomenhofer | ..... | B01D 29/6484 |
| | | | | 210/739 |

* cited by examiner

SCREENING DEVICE FOR USE IN COARSE MATTER SCREENING WELLS OF A WASTE WATER TREATMENT PLANT

Screening device in coarse solids chambers in a wastewater treatment plant.

TECHNICAL SECTOR

The sector of the invention relates to the sector for wastewater treatment by removing or separating particles from liquids.

More specifically, the device of the invention is installed in front of or behind the opening which allows the passage of the wastewater from this coarse solids chamber to the pumping chamber positioned right after same. This opening, usually made in a wall and square-shaped, is positioned at mid-height of the concrete wall separating both chambers, that is, the coarse solids chamber and the pumping chamber. This opening is partially closed by a solids retention grating, through which only smaller sized particles pass.

This device is positioned inside the coarse solids chamber, whereas another part will emerge and be supported above the operating floor. The screen is placed on the other side of the wall and inside the pumping chamber, right behind the retention gratings. The main objective of this screening device is to retain the largest possible amount of medium and coarse solid waste, preventing them from passing into the pumping chamber.

STATE OF THE ART

At present, wipes represent one of the types of waste that most affects and causes the most damage to pumping systems, fine solids screening systems, and even other subsequent processes such as desanding, settling, thickening, and even sludge digestion.

While heavier solid waste entrained by the stream of wastewater upon entry to the coarse solids chamber settles by itself and is deposited at the bottom of the coarse solids chamber since it has a specific weight greater than that of water, the same does not occur with lighter solids. Since they have a specific weight less than that of water, these lighter solids tend to float or remain suspended, without sinking to the bottom of the coarse solids chamber. The actual stream of wastewater inside the coarse solids chamber causes these floating or suspended solids to seek to escape through the opening which allows passage to the pumping chamber.

Currently, to prevent this lighter solid waste from escaping and reaching the following processes, a grating having fixed bars is installed, with a clearance (passage opening) between bars of between 40 and 80 mm. These fixed bars are placed vertically like "prison bars" in the opening which allows the passage of the wastewater from the coarse solids chamber to the pumping chamber positioned right after same. The grating is cleaned as needed, manually raking the dirt retained by the bars and also manually lifting it up with the rake so as to discharge same in a small container positioned on the operating floor.

In turn, heavier solid waste which has been deposited by gravity at the bottom of the coarse solids chamber is periodically removed with the help of a clam shell bucket suspended from a gantry crane.

The startup and driving of the gantry crane and the operation of the clam shell bucket are also performed manually with the help of maintenance personnel from the treatment plant.

The waste removed by the clam shell bucket is discharged into an open container which, once filled, is taken away to a landfill by a container truck which, at the same time, leaves another empty container in its place so that it can continue to provide service. Carrying out these container handling operations will require the manual labor of the truck driver himself/herself and perhaps the help of a plant maintenance operator. An automated operation is not part of the system.

EXPLANATION OF THE INVENTION

In an effort to increase the efficacy of the coarse solids chamber in the operations for screening and removing all the solid waste, that is, both the heavy and the light solid waste, there is proposed the screening device of the invention, said screening system for a wastewater treatment plant having the features of claim 1. Preferred embodiments of the invention are defined in the dependent claims.

A first inventive aspect proposes a device which is installed in a wastewater treatment plant, of the type having a coarse solids chamber in which heavier solids will settle directly at the bottom, whereas lighter solids seek to escape through an opening leading to a pumping chamber. Said device comprises a vertical frame running along the inside of the coarse solids chamber on the sides of the opening leading to a pumping chamber, and to at least the bottom of said opening, wherein the following mechanisms and elements are assembled:

in the lower portion, a first retention grating positioned covering the opening communicating both chambers, formed by a series of vertical bars spaced apart from one another.

A mechanism in the form of a cleaning comb, including a cleaning rake and being provided with a mechanism which moves it to the retention grating positioned opposite the opening leading to a pumping chamber for the purpose of detaching from same the waste which may remain between the bars thereof.

A second grating identical to the aforementioned one which is initially positioned at rest in the upper part, above the water level.

Respective movement mechanisms for moving both gratings, starting with the movement of the grating positioned in the resting position until it is placed in the operating position opposite the opening leading to a pumping chamber, and then starting the ascent of the other grating to the resting position.

Finally, it also incorporates a cleaning brush mechanism for cleaning the grating which is positioned in the upper portion at rest.

The vertical movement mechanism for the rake may consist of a spindle which, upon being rotated by means of a geared motor, descends or ascends vertically, or it may be a hydraulic or pneumatic cylinder; in any case, there is assembled at the end of same said rake which, upon vertical descent, moves closer until it reaches the grating positioned opposite the opening leading to a pumping chamber, and the teeth of this rake fit into the spaces between the bars of the grating and as the rake gradually moves downwards, waste adhered to the surface of the bars also becomes detached and is forced to fall to the bottom of the coarse solids chamber; and once the rake has cleaned the entire surface of the grating from top to bottom, the movement mechanism moves in the opposite direction for the rake to ascend until reaching and recovering the starting position.

According to a feature of the invention, each cleaning cycle for cleaning the grating positioned opposite the opening leading to a pumping chamber will consist of at least one raking cycle. Additionally, the interchange cycle for interchanging the grating that is in the resting position for the one that is in the operating position opposite the opening leading to a pumping chamber is performed periodically, always after one of the raking cycles.

In a second inventive aspect, the invention provides a treatment plant comprising a screening device in coarse solids chambers according to the first inventive aspect.

In a third inventive aspect, the invention provides a screening method in coarse solids chambers in treatment plants comprising, a coarse solids chamber with an access opening to a
        pumping chamber, and
    an access pipe to the coarse solids chamber,
the screening method comprising the following:
    providing a screening device according to the first inven-
        tive aspect, and
    installing said screening device inside the coarse solids
        chamber connected to the inlet pipes of said coarse
        solids chamber and to the access opening to the pump-
        ing chamber.

DESCRIPTION OF THE DRAWINGS

These and other features of the invention will be more readily understood with the help of the description of an embodiment provided below. This description is supported in the attached drawings, in which the following is depicted in an illustrative and non-limiting manner.

EMBODIMENT OF THE INVENTION

The wastewater accompanied by the waste entrained in the wastewater stream empties into the coarse solids chamber (1) through the corresponding inlet pipe. Heavier solids will settle directly at the bottom of the coarse solids chamber (1), and lighter solids will seek to escape through the opening (3) leading to the pumping chamber (2).

When these lighter solids reach this opening (3), they will be met with the screening device of the invention, which is provided with a retention vertical bar grating (4) having a rectangular cross-section and a clearance between bars of 20 mm.

Figure 1:
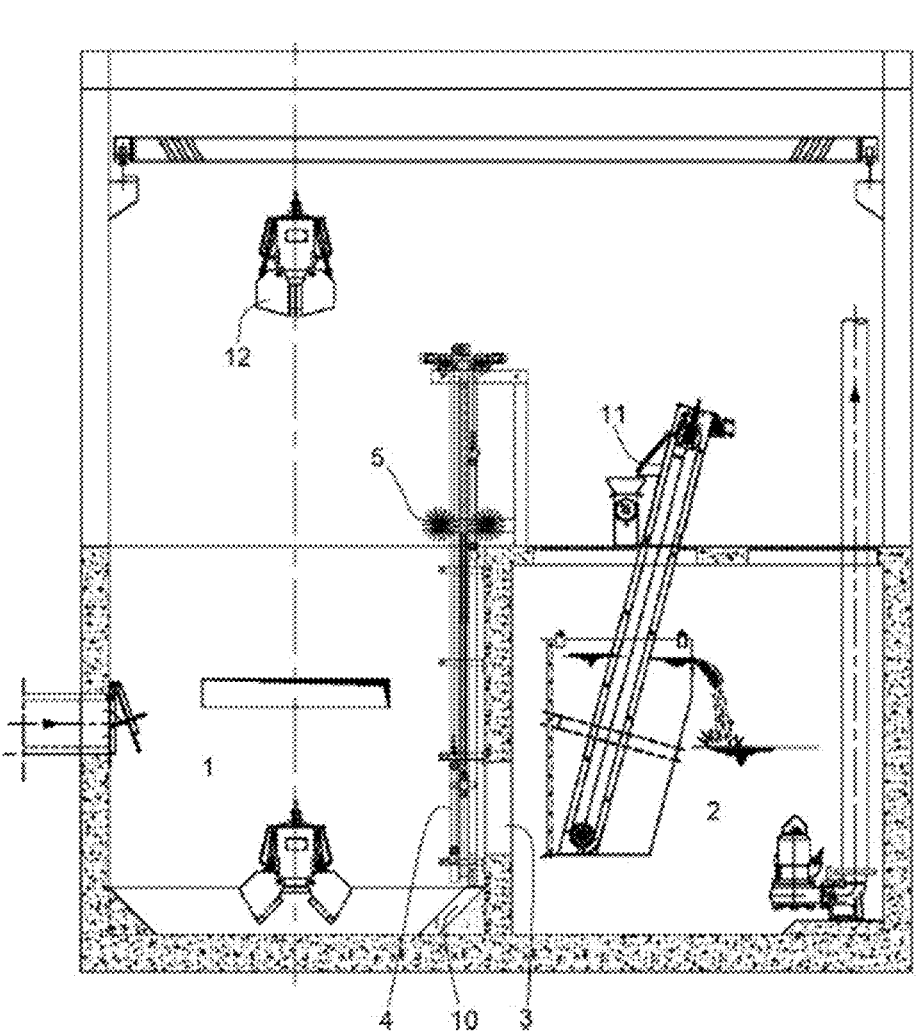
FIG. 1 shows a side elevational view of the coarse solids chamber (1) and pumping chamber (2) of a treatment plant in which the screening device of the invention has been installed.
Figure 2:
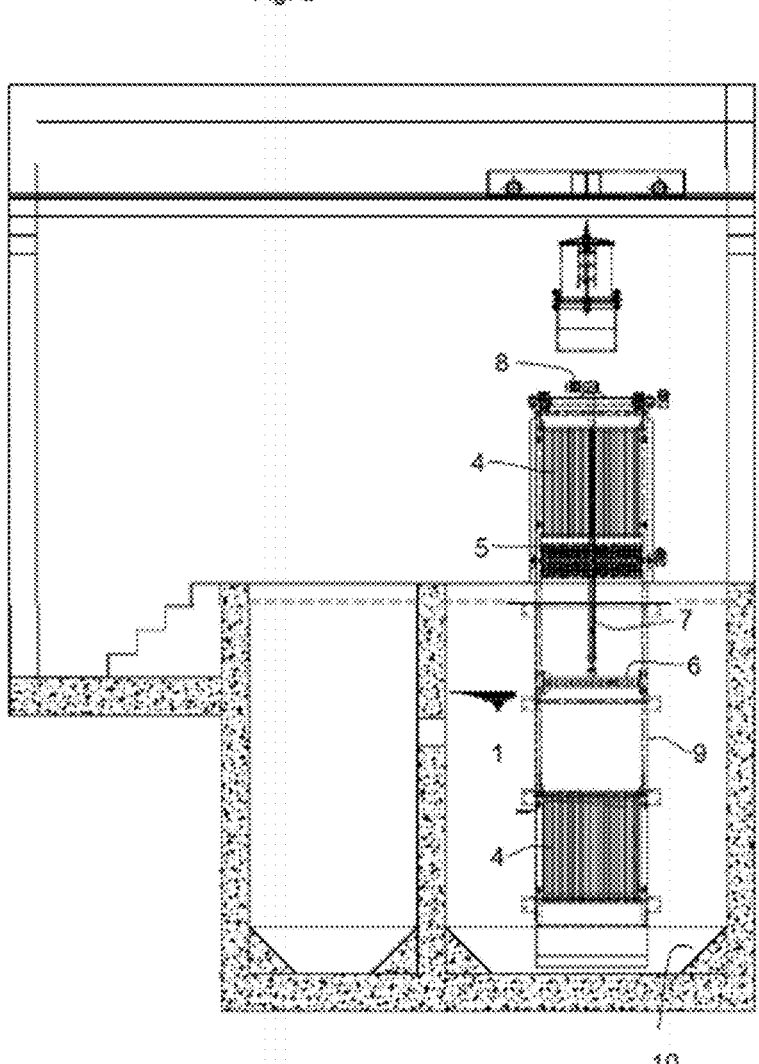
FIG. 2 shows an elevational view from the inside of the coarse solids chamber (1) of said device.
Figure 3:
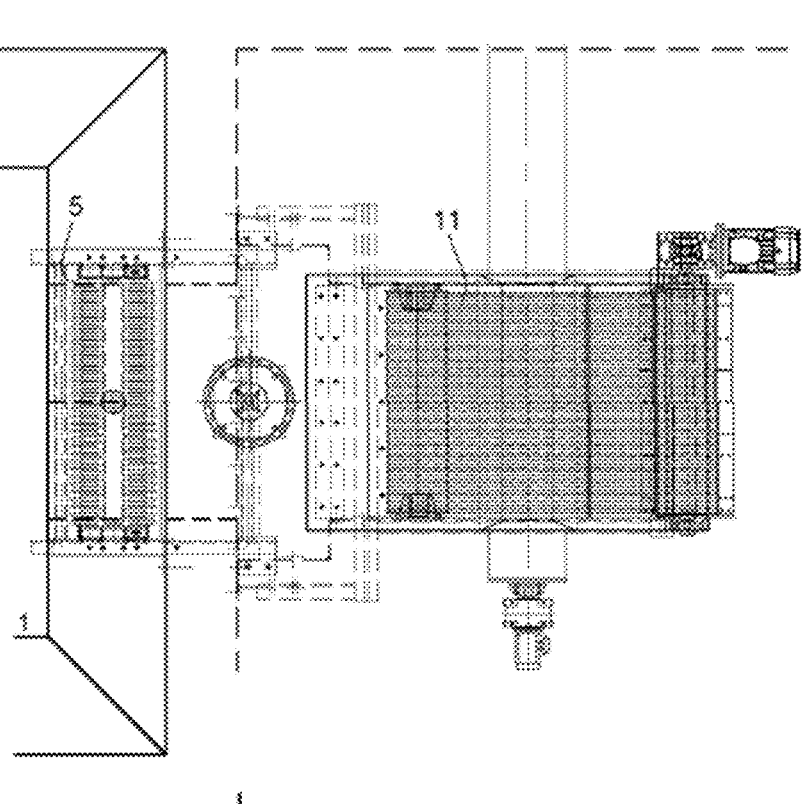
FIG. 3 is a plan view of the area of the treatment plant in which the device of the invention is installed.

The screening device has two gratings (4), one of which is below in a working position, either partially or completely submerged, becoming dirty and retaining solids, while the other one is up in a standby position, ready to enter into service, clean, and positioned above the water level (see FIG. 2).

When the system detects that the grating (4) which is below working is clogged (sufficiently dirty), it will start up a cleaning comb mechanism. In the depicted embodiment, this mechanism consists of a vertically moving rake (6) coupled to the lower end of a spindle (7). The spindle rotates with the help of a geared motor (8) and at the same time it rotates, it also descends vertically and causes the rake (6) to descend at the same time. The rake moves closer until it reaches the grating and the teeth of this rake fit between the free spaces existing between the bars of the grating. The design of the rake with serrated teeth helps to scrape waste off (among such waste, wipes). As the rake (6) gradually moves downwards, waste adhered to the surface of the bars becomes detached and is forced to fall to the bottom of the coarse solids chamber. To improve the ascent or descent of the rake (6) along the guides of the frame (9), the rake has four side rollers incorporated therein.

A lower ramp (10) placed below the grating helps in the detached waste not building up too close to the wall, but rather building up at a certain distance from same to facilitate the work of opening, capturing, and closing of the clam shell bucket (12). Light waste that has arrived and hit against the bars of the grating has been deposited on top of other light waste, over time becoming more compact and heavier bundles of waste and therefore with a certain ease of being able to settle to the bottom of the coarse solids chamber once such waste has been detached from the grating.

It is therefore deduced that the rake (6) of the present system does not lift or extract the waste out of the coarse solids chamber, but rather pushes it and forces it to fall to the bottom of this coarse solids chamber so that the clam shell bucket (12) driven by the gantry crane performs removal tasks.

Once the rake (6) has cleaned the entire surface of the grating (4) from top to bottom, the spindle starts to rotate in the opposite direction for the rake (6) to ascend until reaching and recovering its initial position and being prepared to start a new raking cycle. In principle, each cleaning cycle for cleaning the grating will consist of a single raking, although the system could be adapted to two or more rakings per cycle.

The system is programmed so that periodically, either every raking cycle or every other raking cycle, for example, the dirty grating (4) that is down working ascends with the help of a mechanism for lifting gratings to the position in which a cleaning brush mechanism (5) is located. At this point, it is very important to mention that before the dirty grating starts to move upwards, the other grating that is in a standby position and is clean should have moved downwards with the help of its other pulley mechanism, and right when the clean grating reaches the lower position and is ready to enter into service will be when the dirty grating starts to move upwards. The opening (3) should never be left free without a grating to prevent the passage of coarse solids to the pumping chamber (2).

The mentioned mechanism for lifting the gratings in the depicted embodiment consists of a set of pulleys, the rotating shaft of which is motor-driven, supported at its ends on bearings. As was just mentioned, since there are two gratings, there are also two pulley mechanisms. Each grating (4) has its own pulley mechanism. Each mechanism has a shaft with two pulleys rotating at the same time as the shaft itself does coupled thereto. Depending on their direction of rotation, the pulleys wind up or unwind steel cables linked to rings coupled to the upper part of the grating. When the pulleys wind up cable, the grating ascends, and when they unwind cable, the grating descends. To improve the ascent or descent of the grating along the guides of the frame, like with the rake (6) mentioned above, each of these gratings (4) also has four other side rollers incorporated therein.

With respect to the cleaning brush mechanism (5), it consists of an industrial rotating cleaning brush, arranged in the horizontal position. Each grating (4) also has its own cleaning brush mechanism. While one of the brushes (the one that is located further within the chamber) rotates in a clockwise direction, the other brush (the one that is located close to the wall of the chamber) rotates in a counterclockwise direction, and each brush (5) rotates as a result of the movement transmitted to it by a motor-driven shaft. The ends of the brushes are supported at their ends on respective bearings. When the dirty grating ascends and starts to be positioned in front of the brush, the brush starts to rotate. The tufts of bristles (fibers) of the brush hit against the surface of the bars and get in between the free spaces between them, cleaning off the dirt residues that may still be adhered thereto after the raking cycle. The direction of rotation of the brushes is conceived for the waste detached from the bars to fall to the bottom of the coarse solids chamber. As the grating continues to move upwards, the brush continues to rotate, and when the grating exits above the brush, the brush stops rotating.

The frame (9) is the element on which the rest of the mobile elements are coupled, in addition to the fact that it in turn has incorporated therein vertical guides through which the side rollers of the cleaning comb mechanism (rake (6)) and the side rollers of the gratings (4) circulate in an ascending or descending direction.

As for the gantry crane and the clam shell bucket (12), these are two elements that exist in most treatment plants and are not a direct part of the screening device, but rather are incorporated as complementary elements in what will be an integrated and automated system. The dual function of the gantry crane will consist of driving the clam shell bucket from the container area to the coarse solids chamber area and causing it to descend to the bottom of this chamber and lifting it up again to take it back to the container area. A pulley block coupled to the gantry crane facilitates the descent, ascent, and lateral movement operations of the clam shell bucket. In a synchronized manner, when the bucket moves downwards to the bottom of the chamber at the chosen point, its shells will open to capture the settled waste, then immediately close, and the bucket exits the chamber to be taken to the container area so as to discharge in the containers the waste that has been captured on each trip to the bottom of the chamber. The number of cycles of lowering the bucket to the bottom of the chamber will depend on the surface (in square meters) to be cleaned, on the amount of waste that accompanies the wastewater, and it will be related to the volume capacity of the bucket itself.

After the first step of screening medium-coarse waste carried out by means of the gratings, the wastewater will pass through a medium-fine screening screen (11). This screen (11) will be installed inside an open channel having a rectangular cross-section, and in this case, made of metal. In turn, the inlet end of the metal channel will be anchored to the rear part of the same wall in which the retention gratings are located in the front part. The final end of the channel will have an adjustable overflow spillway.

The wastewater going through the retention gratings (4) enters the metal channel and encounters the screen.

Basically, the screen consists of a motor-driven, perforated-mesh endless belt retaining small-sized waste up to a certain size and allows the wastewater to pass through to overflow into the pumping chamber.

Scrapers coupled to the perforated mesh are in charge of lifting the retained waste to the upper part of the screen so that it is ejected by a scraper cleaning system onto a screw conveyor which finally discharges it into a container.

Having described the nature of the invention as well as a preferred embodiment thereof, it is evident that the invention is industrially applicable in the indicated sector.

It is also stated for all relevant purposes that the materials, shape, size, and arrangement of the described elements may be modified, provided that it does not represent any alteration of the essential features of the invention-claimed below.

The invention claimed is:

1. A screening system for a wastewater treatment plant comprising:
   a solids settling chamber (1);
   a pumping chamber (2);
   a wall separating the settling chamber (1) and the pumping chamber (2)
   an opening (3) extending through the wall placing the settling chamber (1) and the pumping chamber (2) in fluid communication;
   a first movable retention grating (4) for covering the opening (3) comprising a series of vertical bars spaced apart from one another;
   a second movable grating (4) identical to the first movable retention grating (4), capable of being situated above the first movable retention grating (4) and of being vertically positioned in an upper rest position, above a top of the wall;
   respective movement mechanisms for interchangeably moving the first and second movable retention gratings (4) from the upper rest position to an operating position opposite the opening (3);
   a vertical frame (9) disposed within the solids chamber (1);
   a vertically movable rake (6) disposed within the settling chamber (1) and movably supported by the vertical frame (9) and capable of placement adjacent the vertical bars of the first or second movable retention grating (4) such that teeth of the vertically movable rake (6) fit between the spaces between the vertical bars, and waste adhered to the surface of the bars becomes detached as the rake (6) moves past the first retention grating (4);
   a vertical movement mechanism for the rake (6); and
   a rotatable cleaning brush mechanism (5) for cleaning the first or second removable retention grating (4) when positioned in the upper position at rest;
   wherein, the vertically movable rake (6) and the rotatable cleaning brush mechanism (5) are configured for sequential operation.

2. The screening system for a wastewater treatment plant of claim 1, wherein the teeth of the rake are serrated.

3. The screening system for a wastewater treatment plant of claim 1, further comprising a lower ramp (10) which prevents detached waste from building up adjacent to the wall, to facilitate operation of a clam shell bucket (12) for removing accumulated waste from the chamber (1).

4. The screening system for a wastewater treatment plant of claim 1, the cleaning brush mechanism (5) consists of a rotating brush arranged in a horizontal position where tufts of bristles of hit against the surface of the bars of the first or second movable retention grating (4) as the rotating brush moves upwards, removing the dirt residues that may still be adhered thereto after a raking cycle, and fall to the bottom of the solids settling chamber (1).

5. The screening system for a wastewater treatment plant of claim 1, wherein the respective movement mechanisms include independent interchange mechanisms for each first and second movable retention grating (4), configured to move in opposite directions, such that when the first or second movable retention grating (4) closing the opening (3) ascends, the first or second movable retention grating (4) in the resting position descends.

* * * * *